Aug. 9, 1966  M. B. BLACK III, ET AL  3,265,679
CHEMICAL PRODUCT AND METHOD FOR ITS MANUFACTURE
Filed Sept. 19, 1963
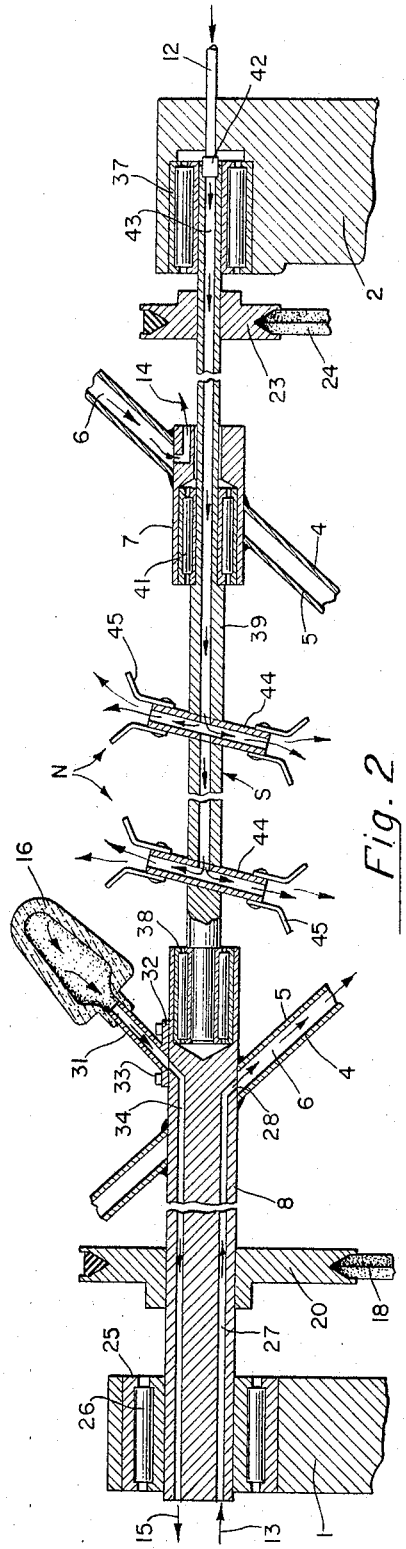
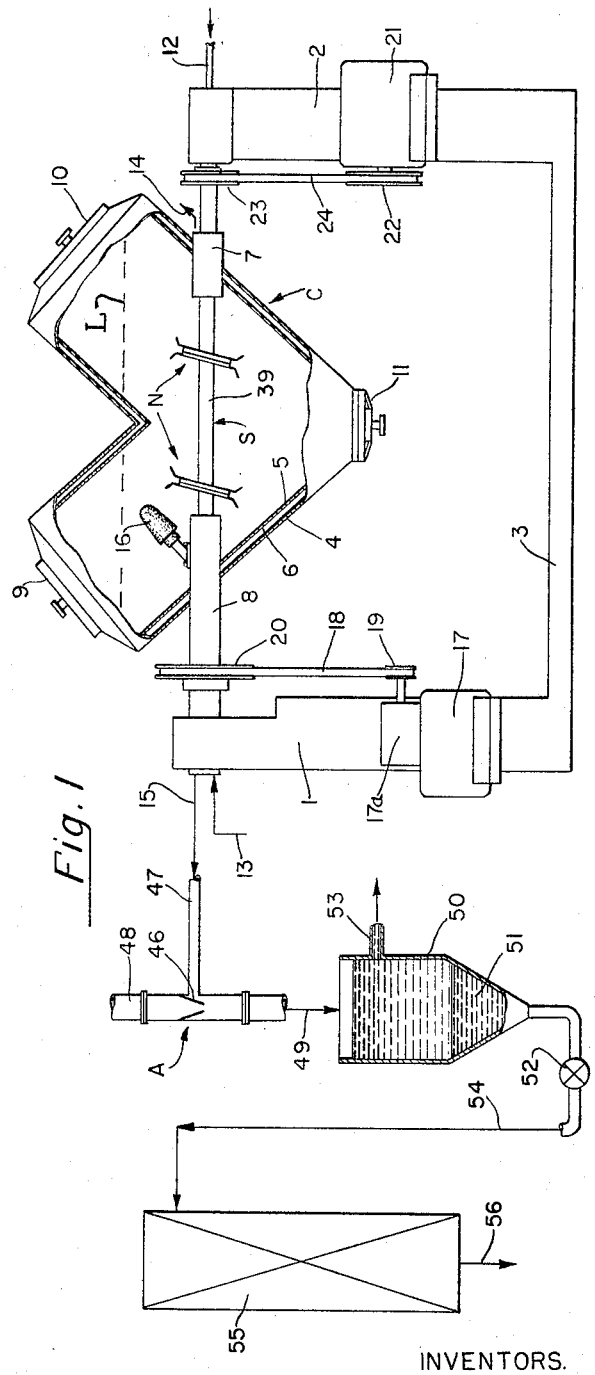
INVENTORS.
MATTHEW B. BLACK, III
ELLSWORTH E. FAUST
WILLIAM S. BARNHART
RAYMOND NETSCH
BY
*ATTORNEY*

United States Patent Office 3,265,679
Patented August 9, 1966

3,265,679
CHEMICAL PRODUCT AND METHOD FOR ITS MANUFACTURE
Matthew B. Black III, Ridley Park, Ellsworth E. Faust, Phoenixville, William S. Barnhart, Lafayette Hill, and Raymond Netsch, North Wales, Pa., assignors to Pennsalt Chemicals Corporation, Philadelphia, Pa., a corporation of Pennsylvania
Filed Sept. 19, 1963, Ser. No. 310,007
11 Claims. (Cl. 260—92.1)

The present invention relates to polytetrafluoroethylene molding powders and more particularly to methods for producing free-flowing granular polytetrafluoroethylene powders suitable for the production of molded articles.

High molecular weight polytetrafluoroethylene resin is produced in two distinct grades or types generally designated by the terms granular grade polytetrafluoroethylene and dispersion grade polytetrafluoroethylene. The two types are distiguished from one another chiefly by the primary or ultimate particles size of the resin as measured by nitrogen adsorption (as distinguished from apparent particle size measured, for example by wet or dry sieve analysis). The granular type resin is characterized by particles which are of irregular shape and which are supercolloidal in size. Nitrogen adsorption measurements of granular type resin indicate a total surface area of the order of 1 to 4 square meters per gram which corresponds to a theoretical primary average particle diameter of the order of 0.6 to 2.7 microns assuming that all particles are spherical. The granular type polymer is generally prepared by polymerization of tetrafluoroethylene in a liquid medium under conditions such that the polymer separates from the medium as it is formed to produce large size irregular particles. Dispersion type polymer on the other hand is characterized by particles which are roughly spherical in shape and which are of the order of about 0.1 to 0.3 micron in diameter corresponding to nitrogen adsorption measurements indicating a total surface area of substantially greater than 4 square meters per gram. Dispersion type polymer is generally prepared by the polymerization of tetrafluoroethylene in an aqueous medium with the use of a surfactant which prevents separation of the polymer from the aqueous medium such that the polymer is obtained in the form of an aqueous latex of colloidal polytetrafluoroethylene particles. The dispersion grade polymer is obtained in particulate form by coagulation of the latex.

As is well known, only the granular type polytetrafluoroethylene is suitable for general molding operations, such for example as compression molding where a mold is filled with a measured amount of polymer powder followed by compression of the powder to the desired shape to produce a "preform" followed by sintering of the "preform" at a temperature above 327° C. according to well known techniques for the molding of granular tetrafluoroethylene powder. Dispersion type polytetrafluoroethylene powder, when used for compression molding and for other similar types of molding operation, tends to stick to the mold and forms a relatively weaker preform. For these and other reasons the use of dispersion type polymer has been generally limited to extrusion molding wherein the powder is usually mixed with a lubricant to form a paste which is then extruded.

Granular type polytetrafluoroethylene, with which the present invention is concerned, is ordinarily obtained from the polymerizer as large size, irregular agglomerates which are unsuitable as such for molding operations. To produce a powder of a smaller, more uniform size, the granular resin is subject to pulverization of varying degrees. In general, as the size is reduced the properties of the final molded articles undergo a progressive improvement. In particular, the tensile strength of the sintered articles progressively increases and the void content decreases. Thus, a granular powder having a wet sieve particle size [a] of about 600 microns may provide molded sintered articles having a tensile strength [b] of the order of 2500 lbs./in.² (p.si.). A somewhat finer powder on the other hand having a wet sieve particle size of about 350 microns will provide tensile strengths of the order of 3000 p.s.i., where as a still more finely pulverized material having a wet sieve size well below 150 microns may provide considerably higher tensile strengths of the order, for example of 4500 p.s.i. Other properties of the molded articles such as percent elongation, porosity and perform strength also tend to improve as the granular powder is pulverized to finer particle sizes.

While finer particle size has been found to improve the properties of the molded end items, it has been found that the finer pulverization has the opposite effect on the handling properties of the powder, particularly its flow properties and bulk density. In general, the finer the particle size, an particulary at a wet sieve size of less than 150 microns, the poorer are the flow properties of the pulverized powder. Thus, the finer powders exhibit a marked tendency to pack and bridge. These poor flow characteristics are especially objectionable in commercial feed devices used in automatic molding of granular polytetrafluoroethylene. In these feed mechanisms the molding powder is generally placed in a hopper mounted on a charging box. The charging box moves over the die and the powder flows into the die cavity generally with aid of a displacing movement such as vibration or rotary motion. The inability of the fine powders to flow into the molds in reproducible fill heights leads to pieces of varying dimensions. Many pieces that do not meet the set dimensional specifications may have to be rejected.

The low bulk density of the fine powders is also a marked disadvantage in that the low density fine powders require deeper preform molds. Since the finer powders may have half the bulk density value of the coarser powders, preform molds twice the height may be required.

Recognizing the poor handling properties of fine granular polytetrafluoroethylene powders, prior workers have proposed various procedures for improving the flowability and increasing the bulk density of these fine powders. It has been suggested, for example that these characteristics may be improved by tumbling the powder while heating at an elevated temperature to form small irregularly sized aggregates. It has been found however that such a procedure requires tumbling for an extended period at relatively high temperatures. Although handling properties are improved by such treatment, the improvement is accomplished at the expense of a substantial reduction in the properties of the final molded resin. In particular, tensile strength is markedly reduced.

A second procedure which has been suggested for improving the handling characteristics of finely pulverized powders is to compress the fine, poorly flowing powder at a pressure of e.g. 2000 p.s.i. and at a temperature of e.g. 170° C. to produce a friable preform which is then ---
[a] Wet sieve particle size, as used herein, is the average particle size diameter d as determined by the procedures set forth in ASTM Designation D1457–62T for TFE Fluorocarbon Resin Molding and Extrusion Materials, issued 1956, revised 1962, pp. 792–803 of ASTM Standards on Plastics, 13th edition November 1962, particularly paragraph 12.
[b] Tensile strength values as given herein, are determined according to the procedures set forth in ASTM Designation D1457–62T for TFE Fluorocarbon Resin Molding and Extrusion Materials, issued 1956 revised 1962, pp. 792–803, loc. cit., particularly paragraphs 7, 8, 9 and 17.

repulverized. Aside from the expense and tedious nature of this procedure, it also reduces the tensile strength of the molded end items relative to the tensile strengths obtainable from the untreated powder.

In accordance with the present invention, a procedure has now been found for treating finely divided granular polytetrafluoroethylene molding powders to greatly improve their flow properties and bulk density while at the same time avoiding any substantial reduction in the desired properties of the molded and sintered resin such as high tensile strength, low porosity and the like. It has been found that this can be accomplished by a procedure which involves wetting fine granular polytetrafluoroethylene powder with a relatively low boiling liquid inert with respect to polytetrafluoroethylene and having a surface tension below about 45 dynes per centimeter and preferably between 15 to about 38 dynes per centimeter (at 20° C.); mechanically forming the wet powder into agglomerates (hereinafter called glomules) having a dry sieve size [c] ranging from about 300 to 3000 microns and drying the gromules to produce a free flowing powder having a markedly increased bulk density.

As will be pointed out in more detail in the description that follows, it becomes possible by means of the procedure outlined above to convert the original fine powder into loose agglomerates or glomules of controlled size which have sufficient firmness to withstand all normal handling operations such as shipping, pouring from container to mold etc. without disintegration, but which are readily deformable under preforming pressures such that the tensile strength of the preformed and sintered resin is not substantially reduced relative to the tensile strength obtainable from the original fine powder before treatment. The procedure of the invention thus not only produces a polytetrafluoroethylene granular molding powder which is vastly improved in flow characteristics and increased in bulk density over the original fine powder, but which also retains the ability of the original fine powder to produce high quality molded products.

Just precisely how the agglomerates or glomules, which are resistant to disintegration under normal handling and are at the same time readily deformable under preforming pressure, are formed by the procedure of the invention is not fully understood. It is believed that the liquid which wets the fine powder contributes to glomule formation by tending to draw the powder into loose small spheres by virtue of the surface tension forces exerted by the liquid. However, since the liquid employed is completely inert with respect to the polytetrafluoroethylene resin (i.e. does not exert any known solvating or chemical bonding effect upon it) it is not understood precisely how the glomules retain their integrity and resistance to disintegration after the liquid coating has been completely removed. The retention of the glomule strength and integrity when dry, i.e. after the complete removal of the liquid used in the glomule formation is surprising and unexpected.

The polytetrafluoroethylene granular molding powders to which the procedure of the invention is applied are those granular powders which have an air sedimentation size [d] of less than about 100 microns. Powders of this type produce high quality molded items, but in the untreated state have poor handling properties particularly with respect to their flowability and bulk density. The procedures of the invention are of particular value in the treatment of granular polytetrafluoroethylene powders having an air sedimentation size of less than 50 microns and most especially in the range of from 10 to 40 microns.

The liquid employed to wet the polymer should as stated above, have a surface tension below about 45 dynes per centimeter and preferably in the range of from 15 to 38 dynes per centimeter (as measured at 20° C.). The surface tensison of the liquid is critical in the procedure of the invention. Liquids having a surface tension above about 45 dynes per centimeter do not sufficiently wet the polymer and are ineffective. For example, water having a surface tension of the order of 70 dynes per centimeter, is inoperable in the procedure of the invention.

The liquid employed must also be completely inert with respect to the resin, i.e., should have no solvating action upon it, nor chemically attack or degrade it in any way. The liquid should also be sufficiently volatile that it can be completely removed from the resin by drying at a temperature well below the sintering temperature of the resin, i.e. not exceeding about 275° C., and preferably not exceeding 200° C. Preferably, it should have a boiling point between about 15° C. to 200° C. at 760 mm. Hg. Liquids having a boiling point between 30° C. and 150° C. at 760 mm. Hg are particularly preferred.

Other preferred characteristics of the liquid include easy handling characteristics such as relatively low toxicity, non-flammability and non-corrosiveness to ordinary materials of construction. It is also preferably neutral in character i.e. displaying no acid or base reaction in aqueous media.

The preferred liquids are composed entirely, or at least predominately, of an organic compound or compounds. Particularly preferred are hydrocarbons both aliphatic and aromatic, halogenated hydrocarbons, alcohols and ketones, particularly aliphatic alcohols and ketones.

The liquid may be a pure compound or a mixture of compounds such as a mixture of alcohol and hydrocarbons, alcohols and ketones, aliphatic and aromatic hydrocarbons etc. The mixture may include a component which in itself would not be useful provided the mixture as a whole has the proper surface tension and is otherwise suitable. Thus for example, while water alone cannot be used in the procedures of the invention, alcohol-water mixtures such as a mixture of 80% methanol and 20% water by volume having a surface tension of the order of 27 dynes per centimeter can be used.

An especially suitable class of liquids from the stand-

---

[c] Dry sieve size, as used herein, is the average particle size diameter $d_{50}$ in microns determined by the following dry sieving technique: a series of U.S. Standard Sieves, eight inches in diameter, numbers 10, 18, 25, 40 and 60 are employed stacked on one another in order, from top to bottom, of decreasing sieve opening size. A sample of the agglomerated powder 50 grams in size is placed on the top sieve and the stack is gently shaken and tapped for about 1 minute to shake down the smaller particles. The topmost sieve (No. 10) is removed and the stack is again shaken about 1 minute after which the top sieve (No. 18) is removed and the stack is again shaken and tapped and so on until the powder has been fractioned between the 5 sieves. The weight of sample on each sieve is determined and from this data the particle size distribution curve is drawn by plotting the cumulative percent of sample on each sieve versus the average opening size of the respective sieves. The dry sieve particle size is taken as the particle diameter at 50 wt. percent ($d_{50}$) on the particle size distribution curve thus determined. Dry sieving rather than wet sieving or air sedimentation techniques is used to measure the size of the glomules because those other techniques tend to cause deagglomeration of the glomules and thus do not proved an accurate measure of their true size.

[d] Air sedimentation size as used herein, is the average particle size diameter $d_{50}$ in microns determined by measuring the air sedimentation rate of a representative sample of the polytetrafluoroethylene powder using air sedimentation apparatus of the type, and following the procedures described in U.S. Patent 2,597,899 using a column providing a free fall distance of eight feet. As described in that patent, from the observed air sedimentation rate, the particle size distribution is determined by calculation from Stokes law relating particle size to rate of fall. From a plot of the particle size distribution thus determined (i.e. a plot of cumulative weight percent of material against particle diameter $d$) the average particle size is taken as the particle diameter at 50 wt. percent ($d_{50}$) on the distribution curve. Air sedimentation size rather than wet sieve size is used herein to characterize the finely-divided polytetrafluoroethylene powders employed as starting materials since wet sieve particle size determination is not reproducibly applicable to polytetrafluoroethylene powders having an average size of less than about 150 microns. Apparatus for performing air sedimentation particle size determinations by the techniques described in U.S. Patent 2,597,899 is commercially available from the Franklin Electronics Corporation under the trade name "Micromerograph."

point of effectiveness, cost, and ease of handling are halogenated hydrocarbons (wherein the halogens are chlorine, fluorine) boiling between about 30° and 150° C. which display surface tensions between 15 and 38 dynes per centimeter. In addition to being non-flammable and relatively non-toxic, these compounds are essentially water immiscible which facilitates their recovery when drying is carried out under reduced pressure by the use of a water driven aspirator as will be described more in detail below.

Examples of a number of typical preferred liquids, together with their boiling point and surface tension are listed in Table 1.

TABLE 1

| Solvent | Boiling point, °C. | Surface tension, dynes/cm. at 20° C. |
|---|---|---|
| Methanol | 65 | 22.6 |
| Ethanol | 78.5 | 22.3 |
| Isopropanol | 82 | 21.7 |
| n-Hexane | 69 | 18.4 |
| m-Xylene | 139 | 28.9 |
| Carbon tetrachloride | 76.8 | 26.8 |
| Trichloroethylene | 87 | 29 |
| Perchloroethylene | 121 | 30 |
| Acetone | 56.5 | 23.7 |
| Methylethylketone | 79.6 | 24.6 |

Any suitable method may be employed to apply the liquid to the polytetrafluoroethylene powder which will uniformly wet the surfaces of the particles. Thus, for example, the wetting may be accomplished while the powder is stationery such as by soaking the powder with an equal volume or more of liquid and then draining off the excess on a filter or the like, or by spraying the liquid on the powder while spread in a thin enough layer so as to thoroughly wet all the particles. It is generally preferred, however to apply the liquid with simultaneous agitation of the powder. A particularly preferred procedure is to tumble the powder, and while tumbling, apply the liquid in the form of a fine mist or fog. Using this latter procedure, the application of the liquid and the formation of the glomules occurs at least to some extent simultaneously as will be explained in more detail below. Preferably the wetting is carried out at normal temperatures.

The amount of liquid employed should be such as to wet thoroughly and uniformly the surfaces of all particles but less than that which will form a slurry or paste. After application of the liquid and mechanical treatment, the agglomerated powder, before drying, should be non-sticky and essentially dry in appearance. When the agglomerated but undried powder is permitted to stand in a container, essentially no liquid should accumulate in the bottom of the container. The amount of liquid which will satisfy these considerations will generally lie in the range of from 10 to 100 milliliters per hundred grams of resin powder. The optimum amount of liquid in each case is best determined empirically since it will depend somewhat upon the fineness of the powder, the specific liquid employed and to some extent upon the method of applying the liquid and the type of mechanical treatment employed to form the wet powder into glomules. In general, increasing amounts of liquid tends to increase the size of the glomules. When excessive amounts of liquid are employed the size of the glomules become undesirably large and non-uniform in size and in addition, the properties of the molded resin, particularly tensile strength, may be deleteriously affected. When too little liquid is employed, the glomule formation does not take place to the desired extent and there is accordingly only minimal improvement in the flowability and bulk density of the powder. In the majority of cases a liquid:powder ratio in the preferred range of 25 milliliters to 75 milliliters of liquid per hundred grams of powder will be found to give a powder of the desired free-flowing characteristics and high bulk density with no substantial adverse effect on the final properties of the molded resin.

The mechanical forming of the wet powder into agglomerates or glomules may be accomplished in various ways. A preferred method is to roll gently or simultaneously to roll and tumble the wet powder for a sufficient time to form glomules of the desired dry sieve size of from about 300 to 3000 microns and preferably from 400 to 1500 microns. For example, the wet powder may be formed into glomules by placing it in a slowly rotating container such that particles of powder tend to roll over one another while at the same time being subjected to gentle mechanical compaction as the glomules strike one another or the walls of the container. The rolling and tumbling action of a rotating vessel is particularly desirable combining as it does the rolling of the powder particles over one another and the gentle compacting action as the newly formed glomules are carried upwardly and gently dropped through short distances against one another and against the walls of the container.

Other types of mechanical action for forming the wet powder into glomules include, for example, rolling the wet powder while in a thin layer on a horizontal tray by subjecting the tray to gentle horizontal oscillations so that the powder particles roll over and against one another to form the desired agglomerates. Still another method involves continuously feeding the wet powder into a rotating tube which may be slightly inclined so that the powder feeds from the higher end of the tube to the lower end, whereby the powder particles are continuously rolled over one another during their travel down the tube. Still another method for mechanically forming the wet powder into glomules is to gently force the wet powder through a wire screen having openings of the proper size, such for example as a wire screen having openings ranging from 800 to 2000 microns in size. The glomules thus formed may optionally be gently tumbled to effect slight compaction.

A particularly preferred method of mechanically forming the wet powder into glomules involves a simultaneous wetting and mechanical treatment step. Thus, for example the powder may be placed in a slowly rotating vessel which gently rolls and tumbles the powder and while thus being mechanically agitated, the liquid is sprayed on the powder in the form of a fine mist or fog. As the powder becomes wet the glomules begin to form. Depending upon the rate of liquid injection and other factors, glomule formation may be completed during liquid injection or the mechanical agitation may continue for a period of time after all the liquid has been added in order to complete the glomule formation.

The mechanical forming operation is preferably and most conveniently carried out at normal (i.e. ambient) temperatures but if desired temperatures somewhat above or below ambient may be employed while, of course, avoiding temperatures at which the wetting liquid may be prematurely volatilized. In general, glomule formation temperatures appreciably greater than ambient are disadvantageous, not only because the wetting liquid becomes more volatile, but because of the greater tendency of the glomules to become unduly compacted.

Following glomule formation, the agglomerated powder is dried to remove all traces of liquid. The drying should be conducted at temperatures below 275° C. and preferably below 200° C. A moderate vacuum, e.g. 50 to 250 mm. Hg is advantageous in permitting rapid, complete removal of the liquid at moderate temperatures. The rate of drying should be such as to avoid over-rapid evaporation of the liquid which would tend to cause disintegration of the glomules. The drying may be conducted under static conditions or while the glomules are subjected to gentle agitation such as slow tumbling in a rotating vessel to continually or intermittently expose new surfaces and thus speed the drying operation. The intensity and duration of the agitation (if any) during drying must however be carefully controlled to avoid undue compaction and hardening of the glomules which in turn leads to loss of tensile strength and other desired properties in the molded resin. In general the higher the drying temperature, the greater the tendency for compaction with agitation, and accordingly the less the amount of agitation permissible.

As is apparent from the foregoing, the ultimate hardness of the glomules produced is affected both by the duration and intensity of the mechanical treatment which forms the wet powder into glomules and the duration and intensity of the agitation if any during the drying operation. The forces exerted during these operations should be gentle enough to avoid undue compaction on the glomules such that they remain readily deformable under usual performing pressures, while at the same time the forces should be sufficient to produce a glomule having sufficient hardness and coherence that it will not disintegrate under normal handling such as during packing, shipment, pouring of the powder from one container to the other or into the molds or the like. The deformability of the glomules is best determined by comparing the tensile strength (by Standard ASTM procedure D 1457–62T) of resin molded from the agglomerated powder to the tensile strength of resin molded from the original untreated powder. The agglomerated material by this test should provide molded resin which retains at least 80% and preferably at least about 90% of the tensile strength of the molded resin prepared from the untreated material.

If desired, after drying, the agglomerated product may be size fractionated e.g. by dry sieving to remove fines and oversize glomules. Preferably the size distribution is such that not more than 20% of the agglomerated product passes a 60 mesh (U.S. Standard) sieve while essentially 100% passes a 6 mesh sieve (by dry sieving). When using preferred procedures however such size fractionation is not necessary. Thus when using preferred liquid: powder ratios and preferred agglomeration techniques such as simultaneous tumbling and spraying, the product obtained from the agglomeration operation without any size fractionation, consists of glomules of the desired dry sieve size ($d_{50}$) (i.e. in the range of from 300 to 3000 and preferably 400 to 1500 microns) and having a size distribution within the above preferred limits.

A number of specific embodiments illustrating the proper correlation of these factors to produce a glomule of the desired hardness are given below. In other cases, not specifically illustrated, the proper combination of conditions can be readily determined by empirical adjustment.

For a better understanding of one prefered embodiment of the invention, reference is now made to the accompanying drawings wherein FIGURE 1 is a semi-diagrammatic view partly in section of a form of apparatus in which all three steps of the procedure of the invention may be carried out, i.e. the wetting, mechanical forming, and drying steps.

FIGURE 2 is an enlarged view partly in cross section of certain portions of the apparatus shown in FIGURE 1.

Referring now to FIGURE 1, the reference letter C refers generally to a cone shaped container supported on a frame consisting of two vertical members 1 and 2 connected by a horizontal bottom structural member 3. The container C is made up of an outer shell 4 and an inner shell 5 defining a chamber 6 between them for the circulation of a heating medium such as steam, hot water or the like. Heating medium for chamber 6 enters through line 13 and leaves through line 14. A shaft designated generally by the reference letter S extends through the central portion of the container made up of enlarged portions 7 and 8 which are fastened to the container shells by welding and a section 39 which is rotatable independently of portions 7 and 8 as will be described in more detail below.

The interior of the container is accessible for loading at the top through two openings which are closed during operation by closures 9 and 10. The cone shaped container is provided at its apex with a third opening sealed during operation by closure 11 from which the powder may be discharged after treatment.

A pair of liquid dispensing nozzles N are mounted on shaft S. Liquid feed enters through line 12. To place the interior of the container under vacuum during the drying operation, vacuum line 15 is provided communicating with the interior of the chamber through conduit means terminating in a hollow porous ceramic member 16.

The entire container C is mounted for rotation at a relatively slow speed, the rotation being effected by means of motor 17 driving belt 18 through speed reducer 17a and pulleys 19 and 20. In addition, the nozzles N are mounted for independent rotation at fast speed on shaft section 39 driven independently of the container as a whole by motor 21 driving pulleys 22 and 23 connected by belt 24.

The details of the liquid feed system, the vacuum system, the system supplying heating medium to the jacketed container, as well as the details of the independent drives for the rotation of the container and the independent shaft section mounting nozzles N are shown in FIGURE 2 of the drawing to which reference is now made.

As can be seen in FIGURE 2, the enlarged shaft portion 8, which is fixedly mounted to the inner and outer container shells 4 and 5, is rotatably supported on bearings 26 in a collar 25 which in turn is supported on the vertical member 1.

To permit the introduction of heating medium into chamber 6 defined by inner and outer shell sections 4 and 5, the member 8 is provided with a passage 27 communicating at 28 with chamber 6. Heating medium such as steam is introduced into passage 27 through line 13 and withdrawn at the opposite side of the container through line 14 by means of a passage provided in member 7.

The porous ceramic member 16 which serves as a filter to prevent powder from entering the vacuum system, is supported within the container on conduit 31 which is rigidly fastened to enlarged shaft portion 8 by means of flange 32 and bolts 33. The conduit 31 communicates with a passage 34 provided in the enlarged shaft portion 8 which in turn communicates with vacuum line 15.

Shaft section 39 of shaft S which is mounted for rotation independently of the rotation of the container C as a whole, is rotatably supported at one end in bearing member 37 and rotatably supported at its opposite end in bearing 38. It passes through member 7, being mounted for rotation within member 7 on bearings 41. With this arrangement, it is apparent that shaft section 39 may be independently rotated on its bearing 37, 41 and 38 when driven by motor 21 through pulleys 22 and 23 by belt 24, while the container C may be independently rotated by means of motor 17 driving member 8 through pulleys 19 and 20 and belt 18.

For the introduction of liquid into the container, liquid feed line 12 is connected through bushing 42 to a passage 43 provided through the shaft section 39. Passage 43 connects with the nozzles N which are each comprised of a pair of closely spaced discs 44, the fineness of the liquid spray provided by nozzles being controlled by the spacing between the discs. Attached to the discs 44 are a series of fingers 45, the purpose of which is to create a rapid stirring and mixing motion in the vicinity of the nozzles as will be described hereinafter in more detail.

To provide a vacuum within the container C during the drying cycle, vacuum line 15 is connected to a water aspirator generally designated by the letter A having a nozzle 46 and inlet arm 47 located at the reduced pressure zone adjacent the nozzle. Water is introduced through line 48, flows through the aspirator and is then conducted by line 49 to a settling vessel 50. Water immiscible liquid is sucked out of container C and condensed by the water stream; separates from the water in settling vessel 50; and collects at the bottom in a layer 51 which is continuously or semi-continuously withdrawn from container 50 through valve 52 while water is withdrawn by line 53. The water immiscible liquid is conducted by line 54 to a dryer 55 where if desired, traces of water may be removed by means, for example of a bed of anhydrous magnesium sulfate or other suitable drying medium. The liquid thus recovered is conducted by line 56 to storage and reuse if desired.

In operation, finely-divided granular polytetrafluoroethylene powder of poor flow characteristics have an air sedimentation size of e.g. 25 microns is introduced into the container C through access openings 9 and 10 to fill the container to the level L. Openings 9 and 10 are then sealed and the container is rotated at a relatively slow speed of e.g. 10 to 40 r.p.m. by means of motor 17 driving shaft portion 8 through pulleys 19 and 20 and belt 18. Under these conditions, the powder is subjected to a gentle rolling and tumbling action in which the individual particles roll over one another while at the same time being continuously lifted and dropped against one another and against the walls of the container.

Rapid rotation of independent shaft portion 39 is initiated by activating motor 21 driving pulleys 22 and 24 through belt 23. At the same time, liquid feed through line 12 and passage 43 is initiated. The liquid which is pumped under pressure to nozzle N issues from the nozzles as a fine spray or fog. Shaft portion 39 is rotated at a high speed of e.g. 2000 to 3500 r.p.m. This rapid rotation forces the liquid, through centrifugal action, out between the closely spaced discs 44 as a fine fog or spray. The rapidly rotating fingers 45 create intense gas currents in the vicinity of the nozzles, creating hollow spaces or cavities in the vicinity of the nozzles so as to permit the spray to disperse beyond the nozzles and thus promote uniform coating of the particles. The rapidly rotating fingers 45 do not strike or directly impinge upon the powder particles but rather set up fluid currents to cavitate and circulate the powder within the container so that the entire body of powder passes within the vicinity of the nozzles to be uniformly wet with liquid.

After a measured amount of liquid e.g. of the order of 50 milliliters per hundred grams of powder, has been introduced into the container, the liquid feed and the rotation of the shaft 39 is discontinued. Typically, the introduction of the liquid may take place over a period of 1 to 6 minutes with the shaft 39 rotating at a speed of e.g. 2000 to 3500 r.p.m. with the container as a whole rotating at a speed of 10 to 40 r.p.m. After the introduction of the necessary liquid, the rotation of the container C may be continued for an additional period of time e.g. from 1 to 5 minutes to complete the formation and slight compaction of the glomules which begin to form as soon as the liquid feed into the container begins.

To dry the agglomerated powder, which now consists of roughly spherical glomules having a dry sieve size of e.g. 800 microns the container C is placed under a vacuum of e.g. 125 mm. Hg by means of the aspirator A. Heating of the container may be effected by circulating a suitable heating medium such as steam or hot water through the heating jacket 6. When using a relatively low boiling liquid such as trichloroethylene or tetrachloroethylene to effect the agglomeration, the removal of the liquid by drying may be accomplished e.g. at a pressure of e.g. 50 to 250 mm. Hg and at a heating medium temperature of e.g. 50° to 150° C. during a drying cycle of e.g. 30 to 180 minutes. During the drying cycle, the agglomerated powder may be gently agitated by slowly rotating container C, at a reduced speed of e.g. 1 to 4 r.p.m. Following the drying cycle, the free-flowing glomules may be readily discharged through the bottom opening 11 of the container. If desired, any small quantities of residual liquid not removed by the drying operation in container C may be removed by a secondary static drying step.

In the type of operation described above, where mechanical agitation occurs during the wetting; and may continue for a period after wetting is complete; and may also continue during drying; the ultimate hardness of the glomules will depend upon the total agitation history, i.e. total time and intensity of agitation. Accordingly the agitation history as a whole must be controlled to produce glomules of the desired hardness, viz. sufficiently firm to withstand normal handling but readily deformable under normal preforming pressures to produce molded resin retaining at least 80% and preferably 90% of the tensile strength obtained with the untreated original fine powder.

The new free-flowing granular polytetrafluoroethylene molding powders that may be obtained in accordance with the procedures described consist of relatively large free flowing glomules having a dry sieve size of from 300 to 3000 microns, and preferably from 400 to 1500 microns; and are characterized by an uncompacted flow rating [e] of at least 25 and preferably at least 36; a compacted flow rating [f] of at least 9 and preferably at least 16; a bulk (apparent) density [g] of from 400 to 850 and preferably from 500 to 750 grams per liter; and a glomule hardness sufficient to withstand normal handling without disintegration but sufficiently deformable under preforming pressures to provide molded resin retaining at least 80% and preferably at least 90% of the tensile strength obtainable from the original untreated finely-pulverized powder.

The above combination of properties represents a valuable improvement over commercially available polytetrafluoroethylene molding powders, providing as it does the highly desirable combination of excellent flowability and high bulk density characteristic of relatively coarse PTFE powders, but lacking in the fine powders, and high tensile strength in the molded resin characteristic of finely pulverized powders, but lacking in the coarser powders.

The following examples illustrate several specific embodiments of the invention.

*Example 1*

Seven pounds of finely-pulverized granular polytetrafluoroethylene molding powder having the properties of

---

[e] The "uncompacted flow rating" is a measure of the flowability of the polytetrafluoroethylene powder in an uncompacted condition and is determined according to the following procedure. A 5-inch high by 2-inch square hopper is filled with a sample of the resin to be tested. The bottom of the hopper consists of a removable screen with a slide valve directly beneath which when opened exposes the entire 2″ x 2″ screen area. Screens are provided having 1, 4, 9, 16, 25, 36, etc. openings per square inch corresponding to 1, 2, 3, 4, 5, 6, etc. meshes per lineal inch. To carry out the test, the hopper is filled with uncompacted powder while the slide valve is closed. The valve is then opened and the hopper is vibrated at a frequency of 60 cycles per second and an amplitude of approximately 1/16″. If powder flows through the screen, then the hopper is recharged with fresh powder, a smaller screen size is inserted, and the test repeated to determine whether the powder flows through the finer screen. The uncompacted flow rating is the number of openings per square inch of the finest screen through which flow is observed. The higher numbers, accordingly, indicate better flow characteristics.

[f] "Compacted flow rating," which is a measure of the flow properties of polytetrafluoroethylene powder after being subjected to compacting conditions is determined by the same procedure used to measure "uncompacted flow rating" except that in each case, prior to opening the slide valve, the hopper is subjected to vibrations for a period of one minute at a frequency of 60 cycles per second and at an amplitude of approximately 1/16″ in order to compact the powder. The slide valve is then opened, and with the hopper still vibrating at the same frequency and amplitude, it is observed whether powder flows through the screen. Since the vibration of the powder tends to lead to more bridging, the compacted flow rating will usually be lower than the uncompacted rating.

[g] Bulk (or apparent) density, as used herein is determined by filling a 50 milliliter graduated glass cylinder having an inside diameter of 22 mm. with resin powder by pouring uncompacted powder into the cylinder without tamping, shaking or tapping, weighing the filled cylinder, subtracting the tare weight, and calculating the density from the weight and volume thus observed.

a Type IV powder as set out in ASTM Designation D 1457–62T is charged to an eight quart capacity liquid-solids blender of the type shown in the drawings except that it is not provided with a heating jacket or vacuum system. The finely-pulverized powder has an air sedimentation size ($d_{50}$) of 28 microns with less than 2% greater than 60 microns (by air sedimentation measurement), and a low bulk density of 254 grams per liter. It has poor flow properties as indicated by an uncompacted flow rating of 4 and a compacted flow rating of 1. Because of its poor flow characteristics, such a powder is difficult or impossible to handle in many types of automatic molding equipment where a measured amount of powder must feed accurately and reproducibly from hoppers into mold openings without bridging or sticking. The low bulk density is a further disadvantage because of the increased size of molding equipment required.

The blender shell, containing the 7 pound charge of the above fluffy, poorly flowing powder, is rotated at a constant speed of 25 r.p.m. thus subjecting the powder to a relatively gentle rolling and tumbling action. With the shell rotating at this speed trichloroethylene is fed into the shell through a pair of nozzles (arranged as shown in the drawing) each consisting of a pair of spaced discs 3½ inches in diameter and spaced apart 0.02 inch. The trichloroethylene issues from nozzles in a fine mist or fog induced by the rotation of the shaft turning the nozzles at a speed of 2300 r.p.m. Each of the two nozzles carry 4 fingers (as shown in the drawing) approximately ¼" wide and 2" long which create rapid air currents in the vicinity of the nozzles thus maintaining circulation of the powder throughout the container and insuring uniform wetting of the powder with the trichloroethylene. In this manner, a total of 1590 milliliters of trichloroethylene is introduced into the container over a period of 4 minutes, thus providing a liquid:powder ratio of 50 milliliters of trichloroethylene per hundred grams of powder. After 4 minutes, the high speed shaft carrying the nozzles is stopped and feed of trichloroethylene is discontinued. The container as a whole is rotated at 25 r.p.m. for one additional minute, giving a total of 5 minutes of tumbling time, during the first 4 minutes of which trichloroethylene is sprayed into the tumbling powder.

Following this treatment, the powder now consisting of roughly spherical agglomerates or glomules is discharged from the container and dried in a forced draft convection oven at 175° C. for 4 hours. The dried product has a dry sieve size ($d_{50}$) of 700 microns and consists 100% of glomules passing a 6 mesh sieve with 3% passing a 60 mesh sieve (by dry sieving).

The product thus produced has more than double the bulk density of the original material (660 grams per liter) and has excellent flow properties, viz. an uncompacted flow rating of 36 and a compacted flow rating of 16 versus flow ratings of 4 and 1 for the original material.

The great improvement in the flow properties of the molding powder produced by the procedures of the invention in contrast to the flow properties of the starting material are further demonstrated by the following flow test. Two glass funnels having a 4 inch maximum diameter, a 30° mouth taper, and a straight stem 3 inches long; one having an internal stem diameter of 7 millimeters and the other a 14 millimeter internal stem diameter, are charged with 65 milliliters of resin powder with the bottom of the funnel stem blocked off. The funnel stem is unblocked and flow (if any) of the resin through the funnel stem is observed. In this test, the light, poorly flowing starting material does not flow out of either funnel even with repeated tapping of the funnel. The agglomerated product obtained according to the above procedure on the other hand readily flows out of both funnels without any tapping or shaking.

The excellent flow properties and bulk density of the molding powders of the invention is further illustrated by the following comparative tests in an automatic molding machine wherein various standard, commercially available granular polytetrafluoroethylene molding powders are compared to the agglomerated molding powders of the invention. In these tests the powder is contained in a hopper-fed charging box open at the bottom which passes over the mold cavity whereupon the powder flows into the cavity by gravity. The mold cavity in each case is an annulus with a 2" outside diameter and a 1½" inner diameter with a fill height of 2". Flow into the mold cavity is assisted by an eccentric revolving motion of the charging box. After filling the mold cavity, a preform is prepared at a preforming pressure of 4380 p.s.i. Three standard types of commercially available molding powders of decreasing particle size, as well as the agglomerated powder produced in accordance with the above procedure, are preformed (10 preforms made in each run) after which the mean weight of the preforms, and the percent standard deviations from the mean weight is determined. The results of these tests are tabulated in Table II.

TABLE II

| Molding Powder | Particle size $d_{50}$ | Number of passes to fill mold | Mean weight of preforms | Percent standard deviation from mean wt. |
|---|---|---|---|---|
| ASTM Type I [1] | 600 microns (wet sieve) | 1 | 20.036 | 4.0 |
| ASTM Type II [1] | 350 microns (wet sieve) | 1 | 23.662 | 1.5 |
| ASTM Type IV [1] | 25 microns (air sedimentation) | 2 | 10.686 | 0.8 |
| Product of Example 1 | 700 microns (dry sieve) | 1 | 25.703 | 0.4 |

[1] See ASTM Designation D1457-62 T.

As is apparent from data in Table II the agglomerated product of Example 1 produced a preform having the smallest percent standard deviation thus indicating the most uniform and reproducible filling of the mold cavity. The finely pulverized ASTM Type IV powder required two passes of the charging box to fill the relatively shallow 2" mold cavity thus exhibiting the poorest flow of all the powders tested. Also because of its low bulk density the fine Type IV powder produced a preform 2½ times smaller than that produced by the agglomerated product of Example 1. The Type IV powder thus would require a mold 2½ times as deep to produce the same size preform.

In addition to excellent flow properties and bulk density as demonstrated above, the agglomerated powder produced by the above procedure suffers no substantial loss in its ability to produce high quality molded resin. Thus, the agglomerated powder retains the ability to produce essentially void-free moldings at moderate preform pressures of 2000 p.s.i. as well as the ability to produce moldings having high tensile ratings characteristic of finely-pulverized powders. Thus, the microvoid rating [h] of moldings produced by the agglomerated powder prepared as described above at a preform pressure of 2000 p.s.i. is excellent and not detectably different from the microvoid rating of the finely-pulverized starting material. The tensile strength of the molded resin produced from the agglomerated powder is 4100 p.s.i retaining 91% of the tensile strength of moldings produced by the original finely-pulverized powder viz. 4500 p.s.i.

While the individual glomules are readily deformable under normal preforming pressures to produce void-free strong moldings, the glomules are at the same time sufficiently strong to withstanding all the normal vibrations, shocks and attrition involved in shipping and handling. For example, the agglomerated powder prepared according to the above procedures shows no significant packing, disintegration or loss of its excellent flow characteristics when carried for approximately 5 days in a commercial delivery truck traveling a distance of over 800 miles with frequent starts, stops, loadings and unloadings.

equipped with semi-circular rotating blades which wipe the surfaces of the screen and force the wet powder through the screen in the form of glomules or aggregates roughly spherical in shape. The glomules thus formed are fed at room temperature into a 3 inch pipe 36 inches long rotating at 60 r.p.m. and tilted downwardly from feed to exit at an angle of 6°, the residence time of the glomules in the pipe being approximately 15 minutes. The agglomerated powder is collected from the end of the pipe and dried for 1 hour at 100° C. It is then dry-sieved and a 10 to 30 mesh portion having a dry sieve size ($d_{50}$) of 1075 microns representing 70% of the total, is collected as the product. The remaining 30% of the material all below 30 mesh in size is recycled with fresh material for re-agglomeration. The product obtained has excellent flow properties, bulk density and molding properties. It has a bulk density of 510 grams per liter (100% improvement over the original finely-pulverized powder) an uncompacted flow rating of 36 and a compacted flow rating of 36 (in contrast to flow ratings of 4 and 1 for the

TABLE III

| Granular polytetra-fluoroethylene molding powder | Particle size microns ($d_{50}$) | | | Bulk density, gms./liter | Flow Properties | | | | Microvoid rating of molded resin at 2,000 p.s.i. preform pressure | Tensile strength of molded resin |
|---|---|---|---|---|---|---|---|---|---|---|
| | Wet sieve | Air Sedimentation | Dry sieve | | Uncompacted flow rating | Compacted flow rating | Funnel flow test | Automatic mold filling percent standard deviation | | |
| ASTM Type I | 600 | | | 500 | 36 | 16 | Will not flow through 7 mm. stem with tapping. | 4 | Poor | 2,500 |
| ASTM Type II | 350 | 175 | | 536 | 36 | 4 | do | 1.5 | do | 3,000 |
| ASTM Type IV | | 28 | | 250 | 4 | 1 | Will not flow through 14 mm. stem even with tapping. | [1] 0.8 | Excellent | 4,500 |
| Agglomerated product of Example 1 | | | 700 | 660 | 36 | 16 | Flows through 7 mm. stem without tapping. | 0.4 | do | 4,100 |

[1] 2 passes over mold cavity required.

A summary of the properties of the agglomerated product compared to three standard commercially available polytetrafluoroethylene molding powders is shown in Table III. As is apparent, the agglomerated powder of Example 1 has flow properties and bulk density as good as, or better than, the relatively coarse ASTM Type I and Type II powders, and vastly better than the highly pulverized, light, poorly flowing Type IV powder. At the same time the product of Example 1 provides a low porosity, high strength molded resin of the same order of excellence as that provided by the finely pulverized poorly flowing Type IV powder.

*Example 2*

A one pound charge of granular polytetrafluoroethylene powder finely-pulverized to an air sedimentation particle size of 24 microns and having a bulk density of 250 grams per liter is wet with 341 milliliters of methanol (75 milliliters per hundred grams of resin) by spraying the powder with the methanol and tumbling for about a minute. The wet powder is then fed at the rate of about 10 grams per minute onto a hemispherical 14 mesh screen

---

[h] Microvoid rating as used herein is determined by making a standard molding using 125 grams of molding powder in a mold having a 1″ x 1¾″ cross-section; preforming at a pressure of 1000 or 2000 p.s.i.; heating the preform from room temperature to 380° C. at the rate of 1.5° C./min. for 2 hrs.; 9° C./min. for 2 hrs.; and 0.5° C./min. for 2 hrs.; holding at 380° C. for 5 hrs.; cooling to room temperature at the rate of 0.3° C./min. for 5 hrs. and 1.1° C./min. for 4 hrs.; preparing a 25 micron thick slice cut perpendicularly to the direction of preform pressure; and observing the slice under an optical microscope by light transmitted through the slice. Voids are seen as dark spots. When there are essentially no voids a rating of excellent is assigned; when only an occasional void is observed occupying a negligible portion of the observed field a rating of good is assigned; when the voids are observed heavily concentrated over the entire field a rating of poor is assigned.

original material). The molded resin has a microvoid rating of excellence at preforming pressures of 1000 and 2000 p.s.i. and a tensile strength of 4000 p.s.i., retaining 93% of the tensile strength provided by the original powder, viz. 4300 p.s.i.

*Examples 3–4*

Granular polytetrafluoroethylene resin is finely-pulverized to a powder having an air sedimentation size ($d_{50}$) of 24 microns with less than 5% having an air sedimentation size greater than 65 microns. This powder has a low bulk density of 212 grams per liter and poor flow properties, having an uncompacted flow rating of 4 and a compacted flow rating of 1. A 3 pound charge of this powder is placed in a 4 quart liquid solid blending apparatus similar to that shown in the drawing except that it is not provided with liquid feed means nor a heating jacket nor vacuum drying means. The rapidly rotating shaft is provided with 10 small rods 1½ inches long, one-quarter inch in diameter to create rapid air currents in the blender during operation. With the blender stationary, 680 milliliters of n-hexane is sprayed on the powder (50 milliliters of n-hexane per 100 grams of resin). The container as a whole is then rotated at a speed of 25 r.p.m. and the center shaft carrying the small rods is rotated at 2000 r.p.m. and treatment of the powder in this manner is continued over a period of 2 minutes. The agglomerated powder is then removed from the container and dried at 100° C. for 2 hours in a forced draft oven. The dry sieve size, the bulk density, the uncompacted flow rating and the compacted flow rating of the agglomerated powder is then measured as well as the tensile strength of moldings produced therefrom.

The above procedure is repeated substituting tetrachloroethylene for hexane and the results of the two runs are shown in Table IV.

TABLE IV

| Ex. | Liquid | Surface tension, dynes/cm. | Dry sieve size of agglomerated product | Flow rating Uncompacted | Flow rating Compacted | Bulk density, grams/liter | Tensile strength, p.s.i. |
|---|---|---|---|---|---|---|---|
| 3 | n-Hexane | 18.4 | 670 | 36 | 16 | 486 | 3,800 |
| 4 | $CCl_2=CCl_2$ | 31.7 | 1,150 | 36 | 16 | 600 | 3,400 |

In each case a dramatic improvement in the bulk density and flow properties is obtained with only a moderate drop in the properties of the molded resin (original tensile strength 4400 p.s.i.).

Examples 5–7

A 100 gram charge of finely-pulverized granular polytetrafluoroethylene molding powder having an air sedimentation size ($d_{50}$) of 24 microns is wet by spraying the resin in a glass jar with shaking for about one minute with 75 milliliters of isopropanol. The wet powder is then fed by a vibratory feeder at the rate of 21 grams per minute (dry basis) to a hemispherical 14 mesh screen equipped with semi-circular rotating blades which wipe the surface of the screen forcing the wet powder through the openings. The roughly spherical glomules thus formed are fed into a 48 inch long, 3 inch diameter pipe rotating at a speed of 60 r.p.m. at room temperature and tilted at an angle of 6° from the feed to the exit end. The product is then collected dried at a temperature of 100° C. for 1 hour and a portion ranging from 8 to 40 mesh in size and representing about 75% of the total is collected as the product, the material below 40 mesh being recycled for further agglomeration. The dry sieve size ($d_{50}$), bulk density, uncompacted flow rating, and compacted flow rating of this product is measured as well as the tensile strength of the molded resin.

The above procedure is repeated substituting ethanol and methylethyl ketone for the isopropanol and the results obtained are tabulated in Table V.

TABLE V

| Ex. | Liquid | Surface tension, dynes/cm. | Dry sieve size of agglomerated product | Flow rating Uncompacted | Flow rating Compacted | Bulk density, grams/liter | Tensile strength, p.s.i. |
|---|---|---|---|---|---|---|---|
| 5 | Isopropanol | 21.7 | 1,000 | 36 | 36 | 546 | 3,760 |
| 6 | Ethanol | 22.3 | 1,000 | 36 | 36 | 648 | 3,970 |
| 7 | Methyl ethyl ketone. | 24.6 | 1,000 | 36 | 36 | 637 | 3,780 |

As it is apparent, both the bulk density and the flow rating of the original material are vastly improved with only a moderate drop in the original molded tensile strength (viz. 4500 p.s.i.) provided by the finely-pulverized poorly flowing resin powder.

Examples 8–10

Finely-pulverized granular polytetrafluoroethylene molding powder having an air sedimentation size of 24 microns, a bulk density of about 250 grams per liter and poor flow properties as evidenced by its inability to flow through a 14 mm. inside diameter funnel stem even with tapping and shaking, is wet with xylene at the rate of 25 milliliters of xylene per hundred grams of powder by spraying the xylene on the powder and shaking for about one-half minute. The wet powder is then fed onto a hemispherical 14 mesh screen equipped with semi-circular rotating blades which wipe the surfaces of the screen and force the wet powder through the screen in the form of glomules or aggregates roughly spherical in shape. The glomules thus formed are collected and dried in a forced draft oven for 4 hours at about 100° C. The dry product is then sieved and a 10 to 35 mesh portion collected as the product.

The above procedures are repeated in the same manner substituting carbon tetrachloride and acetic acid for the xylene. The dry sieve size, the flow properties as measured by the ability of the powder to flow through a 7 mm. and a 14 mm. funnel stem, the bulk density and the tensile strength of moldings produced from the powder are measured and the results are reported in Table VI.

TABLE VI

| Ex. | Liquid | Surface tension, dynes/cm. 20° C. | Dry sieve size of agglomerated product | Flow properties | Bulk density, gms./liter | Tensile strength, p.s.i. |
|---|---|---|---|---|---|---|
| 8 | Xylene | 28.9 | 1,200 | Flow through a 14 mm. funnel stem without tapping; flow through a 7 mm. funnel stem with sligh tapping. | 510 | 4,225 |
| 9 | $CCl^4$ | 26.8 | 1,200 | do | 486 | 4,360 |
| 10 | Acetic acid | 27.6 | 1,200 | do | 556 | 4,025 |

In each case, a dramatic improvement in bulk density and flow properties is obtained with only a small drop in the tensile strength (viz. 4500 p.s.i.) of moldings prepared from the original finely-pulverized poorly flowing powder.

Example 11

This example illustrates the use of a relatively low liquid:resin ratio in the agglomeration procedure. A 200 gram charge of a finely-pulverized granular polytetrafluoroethylene having a bulk density of 250 grams per liter and an air sedimentation size ($d_{50}$) of 24 microns is placed on a vacuum filter and sprayed to saturation was methanol. The saturated powder, containing 174 milliliters of methanol per hundred grams of powder, is subjected to suction of 1½ minutes to remove methanol from the resin until the methanol:resin ratio is reduced to 17 milliliters of methanol per hundred grams of resin. The wet powder is then fed through an 8 mesh hemispherical screen provided with rotating blades which wipe the surfaces of the screen to form roughly spherical glomules which are then dried in an oven at 150° C. for 1 hour. The 10 to 35 mesh portion (representing 65% of the total) of the agglomerated powder thus obtained has a dry sieve size ($d_{50}$) of about 1200 microns, a bulk density of 476 grams per liter and flows readily through a 14 mm. funnel stem without tapping. The tensile strength of resin molded from this material is 4200 p.s.i. compared with a tensile strength of 4215 p.s.i. obtained from the original material.

*Example 12*

This example illustrates the use of a relatively high liquid:resin ratio. 250 grams of finely-pulverized poorly flowing granular polytetrafluoroethylene molding powder having an air sedimentation size of 23 microns; a bulk density of 250 grams per liter, an uncompacted flow rating of 4 and a compacted flow rating of 1, is placed in a jar and wet with 250 milliliters of isopropanol by spraying in the isopropanol and then shaking the jar for one-half minute. The wet resin is then fed through a rotating tube while vibrating at 60 cycles per second to a hemispherical 14 mesh screen equipped with semi-circular blades which force the powder through the screen openings. The agglomerated powder is then dried in a forced air oven for 1 hour at 150° C. and a 10–35 mesh portion is collected. The agglomerated powder has a dry sieve size ($d_{50}$) of 1200 microns, a bulk density of 450 grams per liter, an uncompacted flow rating of 36 and a compacted flow rating of 16. The molded resin has an excellent microvoid rating and a tensile strength of 4130 p.s.i. retaining about 92% of the original tensile strength (viz. 4500 p.s.i.) provided by the original finely-pulverized powder.

We claim:
1. A method for the preparation of free-flowing granular polytetrafluoroethylene molding powder which comprises the step of wetting a pulverized poorly flowing granular polytetrafluoroethylene powder having an air sedimentation size of less than 100 microns with a liquid inert with respect to said resin and having a surface tension in the range of from 15 to 38 dynes per centimeter, the liquid:powder ratio being in the range of from 10 to 100 milliliters of liquid per hundred grams of resin, mechanically forming said wet powder into glomules having a dry sieve size in the range of from 300 to 3000 microns, and then drying said glomules to remove said liquid.

2. A method for the preparation of free-flowing granular polytetrafluoroethylene molding powder which comprises the steps of wetting a pulverized poorly flowing granular polytetrafluoroethylene powder having an air sedimentation size of less than 50 microns with a liquid inert with respect to said resin and having a surface tension in the range of from 15 to 38 dynes per centimeter and a boiling point of from 15° C. to 200° C., the liquid:powder ratio being in the range of from 10 to 100 milliliters of liquid per hundred grams of resin, mechanically forming said wet powder into glomules having a dry sieve size in the range of from 400 to 1500 microns, and the drying said glomules to remove said liquid.

3. A method for the preparation of free-flowing granular polytetrafluoroethylene molding powder which comprises the steps of wetting a pulverized poorly flowing granular polytetrafluoroethylene powder having an air sedimentation size of less than 50 microns with a liquid inert with respect to said resin and having a surface tension in the range of from 15 to 38 dynes per centimeter and a boiling point in the range of from 15° to 200° C., the liquid:power ratio being in the range of from 10 to 100 milliliters per hundred grams of resin; tumbling said wet powder to form glomules having a dry sieve size in the range of from 400 to 1500 microns, and then drying said glomules to remove said liquid.

4. A method in accordance with claim 3 wherein said wetting is carried out by spraying said powder with said liquid while tumbling.

5. A method in accordance with claim 3 wherein said liquid:powder ratio is in the range of from 25 to 75 milliliters of liquid per hundred grams of resin.

6. A method in accordance with claim 3 in which said liquid has a boiling point of from 30 to 150° C.

7. A method in accordance with claim 3 in which said liquid is a halogenated hydrocarbon.

8. A method in accordance with claim 3 in which said liquid is an aliphatic alcohol.

9. A method in accordance with claim 3 in which said liquid is a hydrocarbon.

10. A free flowing granular polytetrafluoroethylene molding powder comprised of glomules of particles of a finely pulverized granular polytetrafluoroethylene powder having an air sedimentation sizes of less than 100 microns, said glomules having a dry sieve size in the range of from 300 to 3000 microns; a bulk density in the range of from 400 to 850 grams per liter; an uncompacted flow rating of at least 25; a compacted flow rating of at least 9; said glomules being sufficiently hard to withstand normal handling without disintegration but readily deformable under preforming pressures to produce essentially pore free moldings retaining at least 80% of the tensile strength of moldings produced from the original finely pulverized powder.

11. A free-flowing granular polytetrafluoroethylene molding powder comprised of glomules of particles of a finely pulverized granular polytetrafluoroethylene powder having an air sedimentation size of less than 50 microns, said glomules having a dry sieve size in the range of from 400 to 1500 microns; a bulk density in the range of from 500 to 750 grams/liter; an uncompacted flow rating of at least 36; a compacted flow rating of at least 16; said glomules being sufficiently hard to withstand normal handling without disintegration but readily deformable under preforming pressures to produce essentially pore free moldings retaining at least 80% of the tensile strength of moldings produced from the original finely-pulverized powder.

References Cited by the Examiner

UNITED STATES PATENTS

| | | | |
|---|---|---|---|
| 2,440,190 | 4/1948 | Alfthan | 264—127 |
| 2,881,142 | 4/1959 | Eldridge | 264—127 |
| 2,915,000 | 12/1959 | Fischer | 264—15 |

ROBERT F. WHITE, *Primary Examiner.*

J. R. HALL, *Assistant Examiner.*

Notice of Adverse Decision in Interference

In Interference No. 96,221 involving Patent No. 3,265,679, M. B. Black III, E. E. Faust, W. S. Barnhart and R. Netsch, CHEMICAL PRODUCT AND METHOD FOR ITS MANUFACTURE, final judgment adverse to the patentees was rendered Sept. 22, 1970, as to claim 10.

[*Official Gazette February 16, 1971*].